Dec. 17, 1946.  P. F. EARLY  2,412,804
RETAINING DEVICE
Filed Nov. 25, 1943

PAUL F. EARLY
INVENTOR
ATTORNEY

Patented Dec. 17, 1946

2,412,804

UNITED STATES PATENT OFFICE 2,412,804

RETAINING DEVICE

Paul F. Early, New Carlisle, Ohio, assignor to Standard-Thomson Corporation, a corporation of Delaware Application November 25, 1943, Serial No. 511,715

7 Claims. (Cl. 285—6.8)

This invention relates to a retaining device and is intended primarily for anchoring an electric cable in a wall through which the cable extends, such as the wall of a switch box or other structure.

One object of the invention is to provide a retaining device which will rigidly connect the cable with the wall through which it extends and thus prevent either longitudinal or rotative movement of the cable with relation to the wall.

A further object of the invention is to provide a retaining device which can be quickly and easily attached to the cable and to the wall through which the cable extends.

A further object of the invention is to provide a retaining device which can be applied to the cable and inserted in the opening from either the inner side or the outer side of the wall, as may be most convenient in a particular installation.

A further object of the invention is to provide a retaining device of simple construction which requires a relatively small amount of material for production and which can be produced at a low cost.

A further object of the invention is to provide a retaining device which can be formed of thin sheet metal and will have ample strength and rigidity for its intended purpose.

Other objects of the invention may appear as the device is described in detail.

Figure 1:
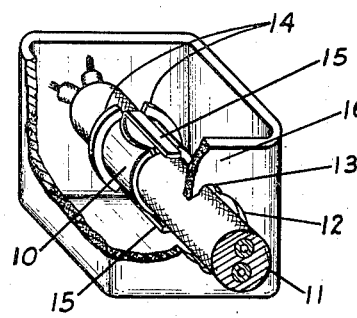
Figure 2:
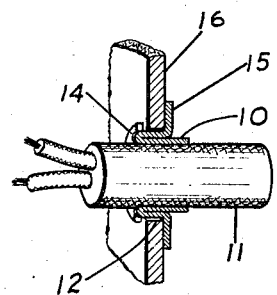
Figure 3:
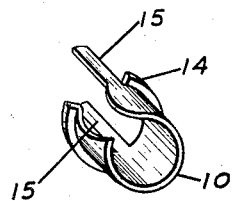
Figure 4:
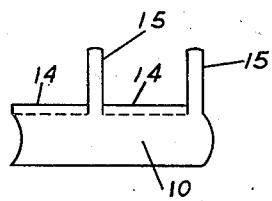
Figure 5:
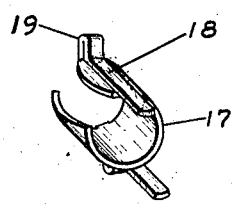
Figure 6:
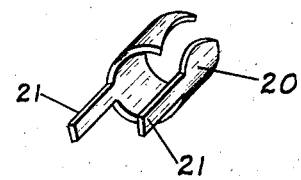
Figure 7:
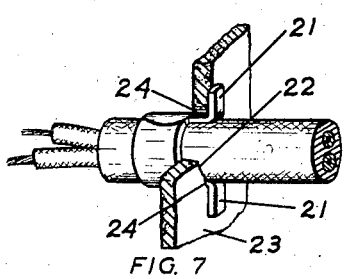
Figure 8:
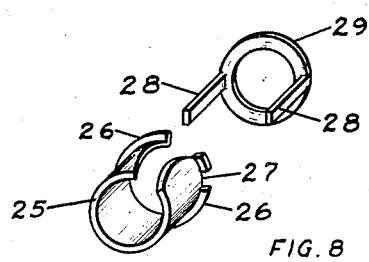
Figure 9:
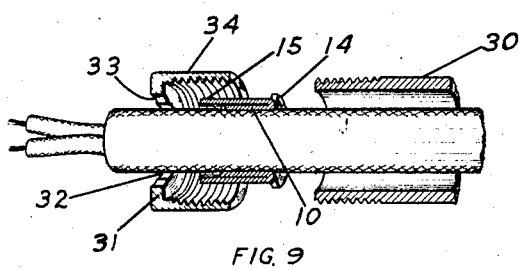

In the accompanying drawing Fig. 1 is a perspective view showing the retaining device secured to a cable within a box, the latter being partly broken away; Fig. 2 is a sectional view showing the retaining device of Fig. 1 located in the opening in the box and rigidly secured therein; Fig. 3 is a perspective view of the retaining device prior to mounting the same on the cable; Fig. 4 is a plan view of a blank from which the retaining device is formed; Fig. 5 is a perspective view of a slightly modified form of the retaining device; Fig. 6 is a perspective view of another form of the retaining device; Fig. 7 is a perspective view, partly broken away, showing the device of Fig. 6 in anchoring position; Fig. 8 is a perspective view of a two part retaining device with the parts separated; and Fig. 9 is a sectional view in perspective showing the retaining device of Fig. 1 as applied when the cable is to be anchored in a conduit, showing the parts in separated positions.

In the drawing I have shown several embodiments of the invention but it is to be understood that these embodiments have been chosen for the purpose of illustration only and that the device may take other forms without departing from the spirit of the invention.

In each of the forms here illustrated the retaining device comprises a band of suitable material, preferably sheet metal, adapted to be compressed tightly about the cable and having a part forming a stop to engage one side of the wall of the structure to which the cable is to be attached, and fingers or prongs connected with one end of the band and adapted to extend through the opening in the wall, alongside of the cable, and to be bent into firm contact with the other side of that wall. The band may be formed from a section of tubing of the proper diameter or from flat stock but due to the greater ease with which it may be formed from flat stock and thereafter compressed on the cable, after the latter has been inserted in the opening, it is usually preferable to preform a flat blank to substantially tubular form with its longitudinal edges spaced apart to permit it to be slipped lengthwise onto the cable and then tightly compressed about the same, and the band is here shown as of such circumferential length that when compressed on the cable said longitudinal edges will be flush one with the other and close together. For most purposes it is preferable that the several parts of the device be formed in one piece but that is not essential.

In Figs. 1 to 4 there is shown a preferred form of the retaining device in which the device comprises a tubular body 10 shown in Fig. 1 as compressed tightly about the cable 11 within a box having in one wall, 16, thereof an opening 12 through which the cable extends, the opening having radial extensions 13 forming recesses, there being in the present instance two recesses arranged at opposite sides of the opening. The body is provided at its rear end, that is, the end remote from the opening, with lateral projections, here shown as a two part flange 14 formed integral with and extending outwardly from the tubular body 10. Fingers 15 formed integral with the flanged end of the tubular body or band are bent forwardly into flat engagement with the band and, in the present instance, extend slightly beyond the forward edge thereof. When the cable is drawn forwardly the tubular band 10 is drawn into the opening 12 until the flange 14 contacts with the inner side of the wall 16 and prevents further forward movement of the band and cable, and the fingers 15 extend through the recesses 13 and prevent the rotation of the band and cable. The fingers then project beyond the outer surface of the wall and are bent into firm engagement therewith to prevent the rearward movement of the band and cable, as shown in Fig. 2, and the retaining device and the cable are thus firmly locked against either longitudinal movement or rotative movement with relation to the wall. In Fig. 3 the retaining device is shown in its initial form, prior to its attachment to the cable, and in this form the band is of substantially tubular shape with the longitudinal edges thereof spaced apart, these edges being preferably curved as shown to minimize the tendency of the cable to pucker during the compression operation and thus force a portion of the material of the cable between these longitudinal edges. The fingers extend longitudinally in line with the body or band, and they preferably remain in this position until the band has been slipped over the end of the cable and compressed thereon, thus avoiding any interference by the fingers with the compressing operation. After the band has been pressed into tight gripping engagement with the cable the fingers are bent to the position shown in Fig. 1. The device as shown in Fig. 3 is formed from the blank shown in Fig. 4, and it will be apparent that the blank is of a very simple character and can be easily stamped out of sheet material and then preformed to the shape shown in Fig. 3.

In Fig. 5 there is shown a slightly modified form of retaining device in which the tubular band or body 17 is of the same form shown in Fig. 3 except that the flanges 14 are omitted and each of the fingers 18, which initially extend rearwardly from the band, as shown in Fig. 3, has those portions thereof adjacent the rear end of the band bent upon themselves, as shown at 19, to form lateral projections or stops to engage the wall through which the cable extends. The forward portions of the fingers are folded onto the body of the blank and the application of the device to the cable and its attachment to the wall of the structure are the same as in Figs. 1 to 4.

In Figs. 6 and 7 there is shown a form of the device in which the tubular band or body 20 is similar in shape to the band shown in Figs. 1 to 5 but has no flange and is provided with fingers 21 extending forwardly from the forward edge of the band and in line therewith. This form of the device is used in an installation in which the opening 22 through the wall 23 is of substantially the same diameter as the cable and is provided with notches. When the band has been compressed tightly about the cable the forward edge thereof is drawn into contact with the wall about the opening 22 and does not enter that opening but the fingers 21 extend through the notches 24 and are bent against the other side of the wall, as shown in Fig. 7. Thus the device and cable are firmly locked against either longitudinal or rotative movement with relation to the wall. This is the simplest form of the device and in many installations is just as effective as the other forms.

While it is usually desirable that the device be formed in one piece it can be formed in two or more pieces and in Fig. 8 there is shown a form of the device in which the fingers are carried by a part separate from the body or tubular portion. As there shown, the tubular body 25 is of the same shape as in the other forms and is adapted to extend through the opening in the wall and is provided at its rear end with a flange 26 forming a stop to limit the movement of the band. This flange 26 is provided with notches, one of which is shown at 27, adapted to receive fingers 28 which are formed integral with and bent forwardly from an annular member or ring 29 adapted to extend about the cable and to be moved into contact with the flanged end of the tubular body and when it has been so positioned the fingers extend through the notches 27 to points adjacent the forward end of the body. Preferably the band is first clamped about the cable and then drawn into the opening with the notches 27 in line with the recesses at the edge of the opening and the annular member 29 is then moved forwardly to insert the fingers 28 through the notches 27 and through the recesses at the edge of the opening and the free ends of the fingers are then bent into contact with that side of the wall opposite the flange 26.

In Fig. 9 I have shown an installation in which a retaining device of the type shown in Figs. 1 to 4 is utilized for anchoring a cable in a conduit 30, the conduit being of a diameter sufficiently greater than the diameter of the cable to receive the retaining device. The forward end of the conduit is provided with a flange 31 which constitutes a wall thereof and has an opening 32 and recesses 33 similar to the openings above referred to. When the conduit is of such a length or so located that the cable and connecting device may be inserted from the rear end of the conduit the flange or wall 31 may be integral with the body of the conduit but when the retaining device must be mounted on the cable after the latter has been inserted in the conduit the wall 31 is formed on a separate part which is thereafter secured to the end of the conduit. As here shown, the flange or wall 31 is a part of a screw threaded collar or nut 34 adapted to be screwed onto the end of the conduit 30 and to then form a part of that conduit. In such an installation the attaching device is slipped onto an end portion of the cable, and the member 34 is slipped over the cable and screwed onto the body of the conduit. The cable and retaining device are then pulled forwardly to move the flange 14 of the retaining device into engagement with the flange 31 of the member 34, with the fingers 15 extending through the recesses 33, and the ends of the fingers are bent outwardly into contact with the outer face of the flange 31, thus firmly anchoring the cable in the conduit.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent is:

1. A device for securing a cable in an opening in the wall of a structure to which it is to be attached comprising a tubular element to be pressed into griping engagement with the cable and having at one end thereof a preformed integral part substantially in the transverse plane of said end to engage one side of said wall, and a finger extending from said part of said element substantially parallel with the axis thereof and adapted to pass through the opening in said wall, the free end portion of said finger being foldable into substantially flat engagement with the other side of said wall after passing through said opening.

2. A device for securing a cable in an opening in the wall of a structure to which it is to be attached comprising a tubular element to extend about and to be pressed into gripping engagement with the cable and to extend through said opening, said element having an outwardly extending projection at the rear end thereof and substantially in the transverse plane of said end to engage one side of said wall, and a straight finger extending forwardly from said rear end of said element substantially in contact with the surface of the latter for insertion through said opening with said element, the end portion of said finger being foldable to substantially right angles to engage the other side of said wall.

3. A device for securing a cable in an opening in the wall of a structure to which it is to be attached comprising a tubular element to extend about and to be pressed into gripping engagement with the cable and to extend through said opening, said element having adjacent the rear end thereof a part rigid therewith to engage one side of said wall, and a finger connected with said rear end of said element, extending forwardly therefrom substantially in contact with the surface of said element and of such length that it will extend forwardly beyond said wall when said element is inserted in said opening, the forward end portion of said finger being foldable against the adjacent side of said wall.

4. A device for securing a cable in an opening in the wall of a structure to which it is to be attached comprising a tubular element to extend about and to be pressed into gripping engagement with the cable and to extend through said opening, a flange extending outwardly from the rear end of said tubular element, adapted to engage one side of said wall and having a radial notch therein, and a finger secured to said rear end of said element and folded forwardly through said notch onto the surface of said element for insertion therewith through said opening, the forward end portion of said finger being foldable into engagement with the other side of said wall.

5. A device for securing a cable in an opening in the wall of a structure to which it is to be attached comprising a tubular element to extend about and to be pressed into gripping engagement with the cable and to extend through said opening, a finger secured to the rear end of said tubular element and having that portion adjacent said end of said element folded upon itself to form an outwardly extending projection to engage one side of said wall, said finger extending forwardly from said folded portion thereof close to said element for insertion therewith through said opening, the free end of said finger being foldable against the outer side of said wall.

6. A device for securing a cable in an opening in the wall of a structure to which it is to be attached, said opening having circumferentially spaced radial extensions, said device comprising a tubular element to extend about and to have gripping engagement with said cable and to fit snugly in the opening in said wall, an outwardly extending flange integral with the rear end of said element adapted to engage one side of said wall and having circumferentially spaced notches, and fingers integral with said rear end of said element and folded forwardly through said notches onto the surface of said element and arranged to pass through the respective extensions of said opening when said element is inserted in said opening, the forward end portions of said fingers being foldable against the other side of said wall.

7. A device for securing a cable in an opening in the wall of a structure to which it is to be attached, said opening having circumferentially spaced radial extensions, said device comprising a tubular element to extend about and to have gripping engagement with said cable and of such diameter that the forward edge thereof will abut against one side of said wall about said opening, and fingers extending forwardly from said forward edge of said element and arranged to extend through the respective extensions of said opening, the forward ends of said fingers being foldable against the other side of said wall.

PAUL F. EARLY.